US006642514B2

(12) United States Patent
Bateman et al.

(10) Patent No.: US 6,642,514 B2

(45) Date of Patent: Nov. 4, 2003

(54) MASS SPECTROMETERS AND METHODS OF MASS SPECTROMETRY

(75) Inventors: Robert Harold Bateman, Knutsford (GB); Kevin Giles, Altrincham (GB)

(73) Assignee: Micromass Limited, Manchester (GB)

( * ) Notice: Subject to any disclaimer, the term of this patent is extended or adjusted under 35 U.S.C. 154(b) by 0 days.

(21) Appl. No.: 09/930,227

(22) Filed: Aug. 16, 2001

(65) Prior Publication Data

US 2002/0063207 A1 May 30, 2002

(30) Foreign Application Priority Data

Nov. 29, 2000 (GB) ............................................. 0029088
Apr. 20, 2001 (GB) ............................................. 0109760
Apr. 25, 2001 (GB) ............................................. 0110149
Jun. 25, 2001 (GB) ............................................. 0115504

(51) Int. Cl.[7] .......................... B01D 59/44; H01J 49/00

(52) U.S. Cl. ........................ 250/288; 250/281; 250/292

(58) Field of Search ................................ 250/281, 282, 250/288, 292

(56) References Cited

U.S. PATENT DOCUMENTS 4,405,860 A * 9/1983 Brunnee et al. ............ 250/288
4,948,962 A * 8/1990 Mitsui et al. ............... 250/288
5,227,629 A * 7/1993 Miseki ........................ 250/292
5,572,035 A 11/1996 Franzen ...................... 250/396
5,818,055 A 10/1998 Franzen ...................... 250/292
5,962,851 A * 10/1999 Whitehouse et al. ....... 250/288
6,107,628 A 8/2000 Smith et al. ................ 250/292
6,423,965 B1 * 7/2002 Hashimoto et al. .......... 250/288
2001/0035498 A1 11/2001 Li et al. ...................... 250/398

FOREIGN PATENT DOCUMENTS

| | | |
|---|---|---|
| CA | 2281405 | 3/2000 |
| GB | 2302985 | 2/1997 |
| GB | 2315364 | 1/1998 |
| JP | 11-307040 | 11/1999 |
| JP | 113852 | 4/2000 |
| JP | 123780 | 4/2000 |
| JP | 2002-15699 | 1/2002 |
| WO | WO97/49111 | 12/1997 |
| WO | WO98/06481 | 2/1998 |
| WO | WO99/38185 | 7/1999 |
| WO | WO99/62101 | 12/1999 |

OTHER PUBLICATIONS

Teloy et al., "Integral Cross Sections for Ion–Molecule Reactions. 'I. The Guided Beam Technique'", Chemical Physics, pp. 417–427, (1974).

(List continued on next page.)

*Primary Examiner*—John R. Lee
*Assistant Examiner*—Paul M. Gurzo
(74) *Attorney, Agent, or Firm*—Diederiks & Whitelaw, PLC

(57) ABSTRACT

A mass spectrometer is disclosed comprising an ion guide which spans two or more vacuum chambers. The ion guide comprises a plurality of electrodes having apertures. Preferably, one of the electrodes also forms a differential pumping aperture which separates two vacuum chambers.

25 Claims, 2 Drawing Sheets

OTHER PUBLICATIONS

Gerlich et al., "Ion Trap Studies of Association Processes in Collisions of $Ch^{+}_3$ and $CD^{+}_3$ with $_{n}$–$H_2$, $_{p}$–$H_2$, $D_2$, and He at 80 K", The Astrophysical Journal, 347 pp. 849–854, 1989.

Gerlich, "Inhomogeneous RF Fields: A Versatile Tool for the Study of Processes with Slow Ions", Advances in Chemical Physics Series. vol. 1.XXXII., 1992.

Shaffer et al., "A Novel Ion Funnel for Focusing Ion at Elevated Pressures", The $45^{th}$ ASMS Conference on Mass Spectrometry and Allied Topics, (1997).

Shaffer et al., "A Novel Ion Funnel for Focusing Ions at Elevated Pressure Using Electrospray Ionization Mass Sepctrometry", Rapid, Communications in Mass Spectrometry, vol. 11, pp. 1813–1817 (1997).

Shaffer et al., "An Ion Funnel Interface for Improved Ion Focusing and Sensitivity Using Electrospray Ionization Mass Spectrometry", Analytical Chemistry, vol. 70, No. 19, pp. 4111–4119, (1998).

Shaffer et al. "Characterization of an Improved Electrodynamic Ion Funnel Interface for Electrospray Ionization Mass Spectrometry", Analytical Chemistry, vol. 71, No. 15, pp. 2957–2964, (1999).

Tolmachev et al., "Charge Capacity Limitations of Radio Frequency Ion Guides In Their Use for Improved Ion Accumulation and Trapping in Mass Spectrometry", Analytical Chemistry, vol. 72, No. 5, pp. 970–978, (2000).

Bailey et al., "Design and Implementation of a New Electrodynamic Ion Funnel", Analytical Chemistry, vol. 72, No. 10, pp. 2247–2255, (2000).

* cited by examiner

MASS SPECTROMETERS AND METHODS OF MASS SPECTROMETRY

The present invention relates to mass spectrometers and methods of mass spectrometry.

Ion guides comprising rf-only multipole rod sets such as quadrupoles, hexapoles and octopoles are well known.

Whitehouse and co-workers have disclosed in WO98/06481 and WO99/62101 an arrangement wherein a multipole rod set ion guide extends between two vacuum chambers. However, as will be appreciated by those skilled in the art, since each rod in a multipole rod set has a typical diameter of around 5 mm, and a space must be provided between opposed rods in order for there to be an ion guiding region, then the interchamber aperture when using such an arrangement is correspondingly very large (i.e. >15 mm in diameter) with a corresponding cross sectional area >150 $mm^2$. Such large interchamber apertures drastically reduce the effectiveness of the vacuum pumps which are most effective when the interchamber orifice is as small as possible (i.e. only a few millimeters in diameter).

It is therefore desired to provide an improved interchamber ion guide.

According to a first aspect of the present invention, there is provided a mass spectrometer as claimed in claim 1.

Conventional arrangements typically provide two discrete multipole ion guides in adjacent vacuum chambers with a differential pumping aperture therebetween. Such an arrangement suffers from a disruption to the rf field near the end of a multipole rod set and other end effects. However, according to the preferred embodiment of the present invention, the ions do not leave the ion guide as they pass from one vacuum chamber to another. Accordingly, end effect problems are effectively eliminated thereby resulting in improved ion transmission.

An ion guide comprised of electrodes having apertures may take two main different forms. In a first form all the internal apertures of the electrodes are substantially the same size. Such an arrangement is known as an "ion tunnel". However, a second form referred to as an "ion funnel" is known wherein the electrodes have internal apertures which become progressively smaller in size. Both forms are intended to fall within the scope of the present invention. The apertured electrodes in either case may comprise ring or annular electrodes. The inner circumference of the electrodes is preferably substantially circular. However, the outer circumference of the electrodes does not need to be circular and embodiments of the present invention are contemplated wherein the outer profile of the electrodes takes on other shapes.

The preferred embodiment of the present invention uses an ion tunnel ion guide and it has been found that an ion tunnel ion guide exhibits an approximately 25–75% improvement in ion transmission efficiency compared with a conventional multipole, e.g. hexapole, ion guide of comparable length. The reasons for this enhanced ion transmission efficiency are not fully understood, but it is thought that the ion tunnel may have a greater acceptance angle and a greater acceptance area than a comparable multipole rod set ion guide.

Accordingly, one advantage of the preferred embodiment is an improvement in ion transmission efficiency.

Although an ion tunnel ion guide is preferred, according to a less preferred embodiment, the inter-vacuum chamber ion guide may comprise an ion funnel. In order to act as an ion guide, a dc potential gradient is applied along the length of the ion funnel in order to urge ions through the progressively smaller internal apertures of the electrodes. The ion funnel is believed however to suffer from a narrow mass to charge ratio bandpass transmission efficiency. Such problems are not found when using an ion tunnel ion guide.

Various types of other ion optical devices are also known including multipole rod sets, Einzel lenses, segmented multipoles, short (solid) quadrupole pre/post filter lenses ("stubbies"), 3D quadrupole ion traps comprising a central doughnut shaped electrode together with two concave end cap electrodes, and linear (2D) quadrupole ion traps comprising a multipole rod set with entrance and exit ring electrodes. However, such devices are not intended to fall within the scope of the present invention.

According to a particularly preferred feature of the present invention, one of the electrodes forming the ion guide may form or constitute a differential pumping aperture between two vacuum chambers. Such an arrangement is particularly advantageous since it allows the interchamber orifice to be much smaller than that which would be provided if a multipole rod set ion guide were used. A smaller interchamber orifice allows the vacuum pumps pumping each vacuum chamber to operate more efficiently.

The electrode forming the differential pumping aperture may either have an internal aperture of different size (e.g. smaller) than the other electrodes forming the ion guide or may have the same sized internal aperture. The electrode forming the differential pumping aperture and/or the other electrodes may have an internal diameter selected from the group comprising: (i) 0.5–1.5 mm; (ii) 1.5–2.5 mm; (iii) 2.5–3.5 mm; (iv) 3.5–4.5 mm; (v) 4.5–5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) ≦10.0 mm; (xii) ≦9.0 mm; (xiii) ≦8.0 mm; (xiv) ≦7.0 mm; (xv) ≦6.0 mm; (xvi) ≦5.0 mm; (xvii) ≦4.0 mm; (xviii) ≦3.0 mm; (xix) ≦2.0 mm; (xx) ≦1.0 mm; (xxi) 0–2 mm; (xxii) 2–4 mm; (xxiii) 4–6 mm; (xxiv) 6–8 mm; and (xxv) 8–10 mm.

The differential pumping aperture may have an area selected from the group comprising: (i) ≦40 $mm^2$; (ii) ≦35 $mm^2$; (iii) ≦30 $mm^2$; (iv) ≦25 $mm^2$; (v) ≦20 $mm^2$; (vi) ≦15 $mm^2$; (vii) ≦10 $mm^2$; and (viii) ≦5 $mm^2$. The area of the differential pumping aperture may therefore be more than an order of magnitude smaller than the area of the differential pumping aperture inherent with using a multipole ion guide to extend between two vacuum regions.

The ion guide may comprise at least 4, 5, 6, 7, 8, 9, 10, 20, 30, 40, 50, 60, 70, 80, 90, 100, 110, 120, 130, 140, 150, 160, 170, 180, 190 or 200 electrodes. At least 90%, preferably 100% of the electrodes may be arranged and adapted to be maintained at substantially the same dc reference potential upon which an AC voltage is superimposed.

According to the preferred embodiment, when the ion guide extends between two vacuum chambers, the pressure in the upstream vacuum chamber may, preferably, be: (i) ≧0.5 mbar; (ii) ≧0.7 mbar; (iii) ≧1.0 mbar; (iv) ≧1.3 mbar; (v) ≧1.5 mbar; (vi) ≧2.0 mbar; (vii) ≧5.0 mbar; (viii) ≧10.0 mbar; (ix) 1–5 mbar; (x) 1–2 mbar; or (xi) 0.5–1.5 mbar. Preferably, the pressure is less than 30 mbar and further preferably less than 20 mbar. The pressure in the downstream vacuum chamber may, preferably, be: (i) $10^{-3}$–$10^{-2}$ mbar; (ii) ≧$2\times10^{-3}$ mbar; (iii) ≧$5\times10^{-3}$ mbar; (iv) ≦$10^{-2}$ mbar; (v) $10^{-3}$–$5\times10^{-3}$ mbar; or (vi) $5\times10^{-3}$–$10^{-2}$ mbar.

At least a majority, preferably all, of the electrodes forming the ion guide may have apertures having internal diameters or dimensions: (i) ≦5.0 mm; (ii) ≦4.5 mm; (iii) ≦4.0 mm; (iv) ≦3.5 mm; (v) ≦3.0 mm; (vi) ≦2.5 mm; (vii) 3.0±0.5 mm; (viii) ≦10.0 mm; (ix) ≦9.0 mm; (x) ≦8.0 mm; (xi) ≦7.0 mm; (xii) ≦6.0 mm; (xiii) 5.0±0.5 mm; or (xiv) 4–6 mm.

The length of the ion guide may be: (i) ≧100 mm; (ii) ≧120 mm; (iii) ≧150 mm; (iv) 130±10 mm; (v) 100–150 mm; (vi) ≦160 mm; (vii) ≦180 mm; (viii) ≦200 mm; (ix) 130–150 mm; (x) 120–180 mm; (xi) 120–140 mm; (xii) 130 mm±5, 10, 15, 20, 25 or 30 mm; (xiii) 50–300 mm; (xiv) 150–300 mm; (xv) ≧50 mm; (xvi) 50–100 mm; (xvii) 60–90 mm; (xviii) ≧75 mm; (xix) 50–75 mm; (xx) 75–100 mm; (xxi) approx. 26 cm; (xxii) 24–28 cm; (xxiii) 20–30 cm; or (xxiv) ≧30 cm.

According to a preferred embodiment, the ion source is an atmospheric pressure ion source such as an Electrospray ("ES") ion source or an Atmospheric Pressure Chemical Ionisation ("APCI") ion source. According to an alternative embodiment, the ion source may be a Matrix Assisted Laser Desorption Ionisation ("MALDI") ion source or an Inductively Coupled Plasma ("ICP") ion source. The MALDI ion source may be either an atmospheric source or a low vacuum source.

According to a preferred embodiment, the ion source is a continuous ion source.

The mass spectrometer preferably comprises either a time-of-flight mass analyser, preferably an orthogonal time of flight mass analyser, a quadrupole mass analyser or a quadrupole ion trap.

According to a second aspect of the present invention, there is provided a mass spectrometer as claimed in claim 21.

Preferably, an electrode of the ion guide forms a differential pumping aperture between the input and intermediate vacuum chambers.

Preferably, the mass spectrometer comprises means for supplying an AC-voltage to the electrodes. Preferably, an AC generator is provided which is connected to the electrodes in such a way that at any instant during an AC cycle of the output of the AC generator, adjacent ones of the electrodes forming the AC-only ion guide are supplied respectively with approximately equal positive and negative potentials relative to a reference potential.

In one embodiment the AC power supply may be an RF power supply. However, the present invention is not intended to be limited to RF frequencies. Furthermore, "AC" is intended to mean simply that the waveform alternates and hence embodiments of the present invention are also contemplated wherein non-sinusoidal waveforms including square waves are supplied to the ion guide.

According to a third aspect of the present invention, there is provided a mass spectrometer as claimed in claim 24.

Preferably, at least 5, 10, 15, 20, 25, 30, 35, 40, 45, 50 or 100 of the electrodes are disposed in one or both vacuum chambers.

According to a fourth aspect of the present invention, there is provided a mass spectrometer as claimed in claim 29.

According to a fifth aspect of the present invention, there is provided a mass spectrometer as claimed in claim 30.

Preferably, a differential pumping aperture between the vacuum chambers is formed by an electrode of the ion guide, the differential pumping aperture having an area ≦20 $mm^2$, preferably ≦15 $mm^2$, further preferably ≦10 mm.

According to a sixth aspect of the present invention, there is provided a mass spectrometer as claimed in claim 32.

According to a seventh aspect of the present invention, there is provided a mass spectrometer as claimed in claim 33.

According to a eighth aspect of the present invention, there is provided a mass spectrometer as claimed in claim 34.

According to this embodiment a substantially continuous ion tunnel ion guide may be provided which extends through two, three, four or more vacuum chambers. Also, instead of each vacuum chamber being separately pumped, a single split flow vacuum pump may preferably be used to pump each chamber.

According to a ninth aspect of the present invention, there is provided a method of mass spectrometry as claimed in claim 35.

According to a tenth aspect of the present invention, there is provided a method of mass spectrometry as claimed in claim 36.

According to an eleventh aspect of the present invention, there is provided a mass spectrometer as claimed in claim 37.

Various embodiments of the present invention will now be described, by way of example only, and with reference to the accompanying drawings in which.

Figure 1:
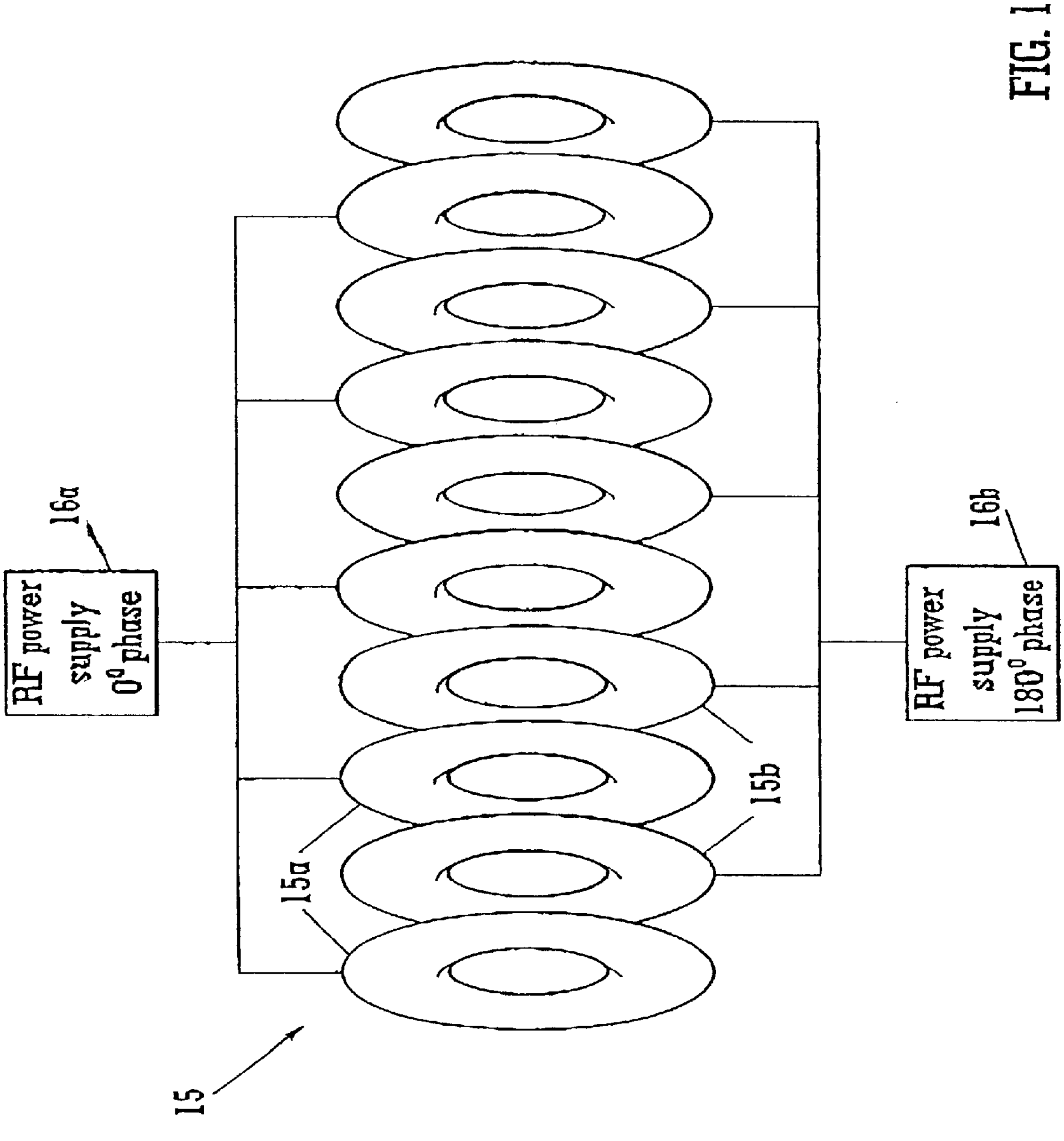
FIG. 1 shows an ion tunnel ion guide.

As shown in FIG. 1, an ion tunnel 15 comprises a plurality of electrodes 15*a*,15*b* having apertures. Adjacent electrodes 15*a*,15*b* are connected to different phases of an AC power supply which may in one embodiment be an RF power supply. For example, the first, third, fifth etc. electrodes 15*a* may be connected to the 0° phase supply 16*a*, and the second, fourth, sixth etc. electrodes 15*b* may be connected to the 180° phase supply 16*b*. Ions from an ion source pass through the ion tunnel 15 and are efficiently transmitted by it. In contrast to an ion funnel arrangement, preferably all of the electrodes 15*a*,15*b* are maintained at substantially the same dc reference potential about which an AC voltage is superimposed. Unlike ion traps, blocking dc potentials are not applied to either the entrance or exit of the ion tunnel 15.

Figure 2:
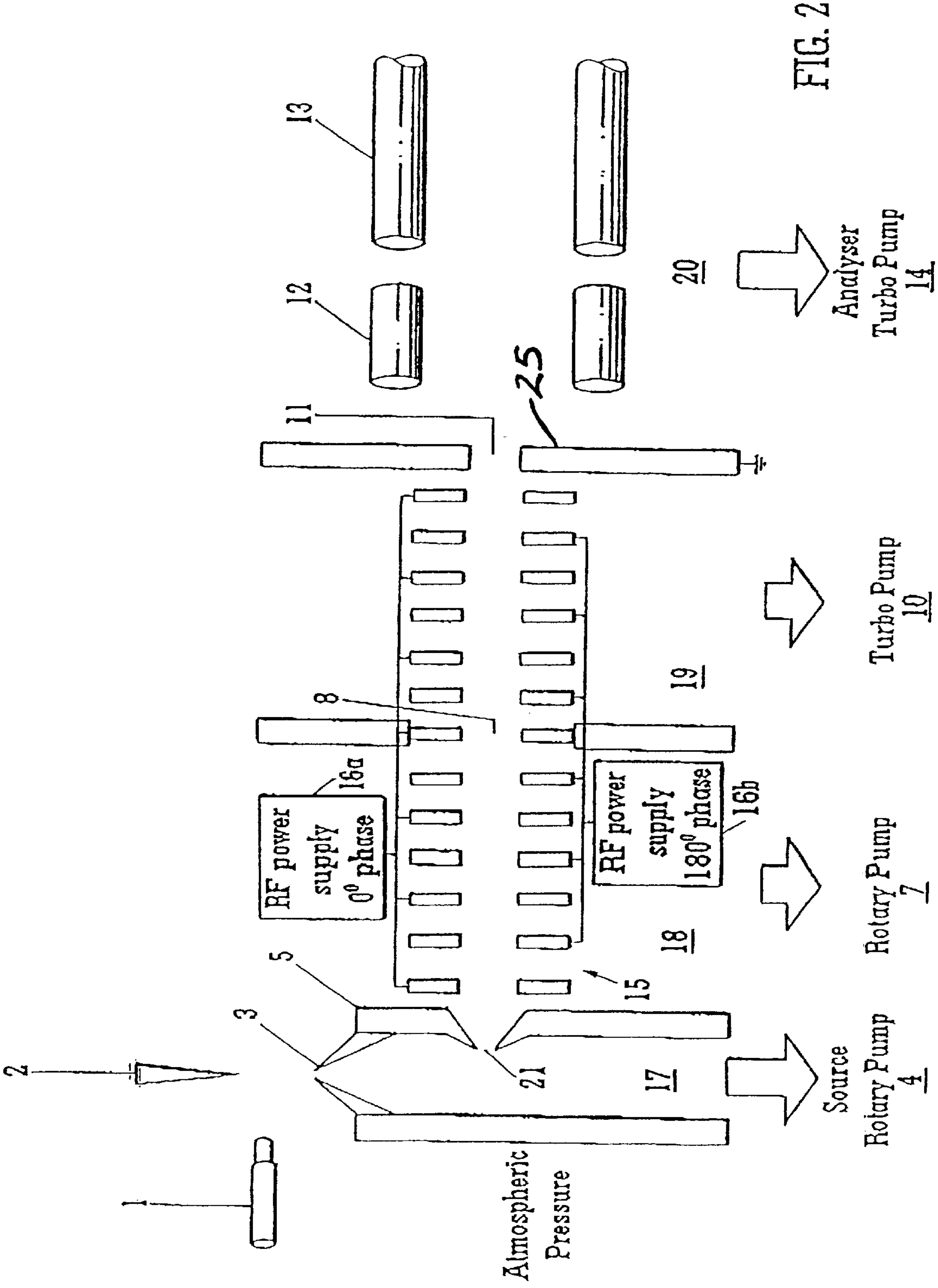
FIG. 2 shows a preferred arrangement.

FIG. 2 shows a preferred embodiment of the present invention. An Electrospray ("ES") ion source 1 or an Atmospheric Pressure Chemical Ionisation ("APCI") ion source 1 (which requires a corona pin 2) emits ions which enter a vacuum chamber 17 via a sample cone 3. Vacuum chamber 17 is pumped by a rotary or mechanical pump 4. A portion of the gas and ions pass through a differential pumping aperture 21 with the plate surrounding the aperture being preferably maintained at 50–120 V into a vacuum chamber 18 housing an ion tunnel ion guide 15 which extends into another vacuum chamber 19. Vacuum chamber 18 is pumped by a rotary or mechanical pump 7. Ions are transmitted by the ion guide 15 through the vacuum chamber 18 and pass, without exiting the ion guide 15, through another differential pumping aperture 8 formed by an electrode of the ion tunnel ion guide 15 into vacuum chamber 19 which is pumped by a turbo-molecular pump 10. Ions continue to be transmitted by the ion tunnel ion guide 15 through the vacuum chamber 19. The ions then leave the ion guide 15 and pass through differential pumping aperture 11 into an analyser vacuum chamber 20 which is pumped by a turbo-molecular pump 14. Analyser vacuum chamber 20 houses a prefilter rod set 12, a quadrupole mass filter/analyser 13 and may include other elements such as a collision cell (not shown), another quadrupole mass filter/analyser together with an ion detector (not shown) or a time of flight analyser (not shown).

An AC-voltage is applied to the electrodes and the ion tunnel 15 is preferably maintained at 0–2 V dc above the dc potential of the plate forming the differential pumping aperture 11 which is preferably at ground (0 V dc). According to other embodiments, the plate forming the differential pumping aperture 11 may be maintained at other dc potentials.

The ion tunnel 15 is preferably about 26 cm long and in one embodiment comprises approximately 170 ring electrodes. Upstream vacuum chamber 18 is preferably maintained at a pressure ≧1 mbar, and downstream vacuum chamber 19 is preferably maintained at a pressure of $10^{-3}$–$10^{-2}$ mbar. The ion guide 15 is preferably supplied with an AC-voltage at a frequency of between 1–2 MHz. However, according to other embodiments, frequencies of 800 kHz-3 MHz may be used. The electrodes forming the ion tunnel 15 preferably have circular apertures which preferably have a diameter in the range of 3–5 mm.

Embodiments of the present invention are also contemplated wherein electrodes of the ion tunnel in one vacuum chamber have a different peak AC voltage amplitude compared with electrodes of the same ion tunnel which are disposed in another vacuum chamber. For example, with reference to FIG. 2 the electrodes disposed in chamber 18 may be coupled to the AC power supply **16*a*,16*b* via a capacitor but the electrodes disposed in chamber 19 may be directly coupled to the AC power supply 16*a*,16*b*. Accordingly, the electrodes disposed in chamber 19 may see a peak AC voltage of 500 V, but the electrodes disposed in chamber 18 may see a peak AC voltage of 300 V. The electrode which forms the differential pumping aperture 8 may be maintained at the AC voltage of either the electrodes in chamber 18 or the electrodes in chamber 19**, or alternatively the electrode may be maintained at a voltage which is different from the other electrodes.

What is claimed is:

1. A mass spectrometer comprising:

an ion source;

an input vacuum chamber;

an analyser vacuum chamber including an ion mass analyser;

an intermediate vacuum chamber, said intermediate vacuum chamber being disposed between said input vacuum chamber and said analyser vacuum chamber; and an AC ion guide extending between said input vacuum chamber and said intermediate vacuum chamber;

wherein said AC ion guide includes a plurality of electrodes having internal apertures, at least a majority of said electrodes have substantially similar sized internal apertures, and at least 90% of said plurality of electrodes are arranged to be maintained at substantially the same dc reference potential about which an AC voltage supplied to said electrodes is superimposed.

2. A mass spectrometer as claimed in claim 1, wherein said ion guide comprises at least 4, 5, 6, 7, 8, 9, 10, 20, 30, 40, 50, 60, 70, 80, 90, 100, 110, 120, 130, 140, 150, 160, 170, 180, 190 or 200 electrodes.

3. A mass spectrometer as claimed in claim 2, wherein said ion guide comprises at least 100 electrodes.

4. A mass spectrometer as claimed in claim 1, wherein the pressure in said input vacuum chamber is selected from the group consisting of: (i) ≧0.5 mbar; (ii) ≧0.7 mbar; (iii) ≧1.0 mbar; (iv) ≧1.3 mbar; (v) ≧1.5 mbar; (vi) ≧2.0 mbar; (vii) ≧5.0 mbar; (viii) ≧10.0 mbar; (ix) 1–5 mbar; (x) 1–2 mbar; and (xi) 0.5–1.5 mbar.

5. A mass spectrometer as claimed in claim 1, wherein the pressure in said intermediate vacuum chamber is selected from the group consisting of: (i) $10^{-3}$–$10^{-2}$ mbar; (ii) ≧$2\times10^{-3}$ mbar; (iii) ≧$5\times10^{-3}$ mbar; (iv) ≧$10^{-2}$ mbar; (v) $10^{-3}$–$5\times10^{-3}$ mbar; and (vi) $5\times10^{-3}$–$10^{-2}$ mbar.

6. A mass spectrometer as claimed in claim 1, wherein the length of said ion guide is selected from the group consisting of: (i) ≧100 mm; (ii) ≧120 mm; (iii) ≧150 mm; (iv) 130±10 mm; (v) 100–150 mm; (vi) ≧160 mm; (vii) ≧180 mm; (viii) ≧200 mm; (ix) 130–150 mm; (x) 120–180 mm; (xi) 120–140 mm; (xii) 130 mm±5, 10, 15, 20, 25 or 30 mm; (xiii) 50–300 mm; (xiv) 150–300 mm; (xv) ≧50 mm; (xvi) 50–100 mm; (xvii) 60–90 mm; (xviii) ≧75 mm; (xix) 50–75 mm; (xx) 75–100 mm; (xxi) approx. 26 cm; (xxii) 24–28 cm; (xxiii) 20–30 cm; and (xxiv) >30 cm.

7. A mass spectrometer as claimed in claim 1, wherein said ion source is an atmospheric pressure ion source.

8. A mass spectrometer as claimed in claim 7, wherein said ion source is an Electrospray ("ES") ion source or an Atmospheric Pressure Chemical Ionisation ("APCI") ion source.

9. A mass spectrometer as claimed in claim 7, wherein said ion source is an Inductively Coupled Plasma ("ICP") ion source.

10. A mass spectrometer as claimed in claim 1, wherein said ion source is a Matrix Assisted Laser Desorption Ionisation ("MALDI") ion source.

11. A mass spectrometer as claimed in claim 1, wherein said mass analyser is selected from the group consisting of: (i) a time-of-flight mass analyser, preferably an orthogonal time of flight mass analyser; (ii) a quadrupole mass analyser; and (iii) a quadrupole ion trap.

12. A mass spectrometer comprising:

an ion source;

an input vacuum chamber;

an analyser vacuum chamber including an ion mass analyser;

an intermediate vacuum chamber, said intermediate vacuum chamber being disposed between said input vacuum chamber and said analyser vacuum chamber; and an AC ion guide extending between said input vacuum chamber and said intermediate vacuum chamber, wherein said AC ion guide includes a plurality of electrodes having internal apertures and wherein an electrode of said AC ion guide forms a differential pumping aperture between and spaced from both an inlet of said input vacuum chamber and an outlet of said intermediate vacuum chamber, said differential pumping aperture having an area ≦40 $mm^2$.

13. A mass spectrometer as claimed in claim 12, wherein at least a majority of said electrodes have substantially similar sized internal apertures.

14. A mass spectrometer as claimed in claim 12, wherein the electrode forming said differential pumping aperture has an internal diameter selected from the group consisting of: (i) 0.5–1.5 mm; (ii) 1.5–2.5 mm; (iii) 2.5–3.5 mm; (iv) 3.5–4.5 mm; (v) 4.5—5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) ≦10.0 mm; (xii) ≦9.0 mm; (xiii) ≦8.0 mm; (xiv) ≦7.0 mm; (xv) ≦6.0 mm; (xvi) ≦5.0 mm; (xvii) ≦4.0 mm; (xviii) ≦3.0 mm; (xix) ≦2.0 mm; (xx) ≦1.0 mm; (xxi) 0–2 mm; (xxii) 2–4 mm; (xxiii) 4–6 mm; (xxiv) 6–8 mm; and (xxv) 8–10 mm.

15. A mass spectrometer as claimed in claim 12, wherein at least a majority of the electrodes apart from the electrode forming said differential pumping aperture have internal diameters selected from the group consisting of: (i) 0.5–1.5 mm; (ii) 1.5–2.5 mm; (iii) 2.5–3.5 mm; (iv) 3.5–4.5 mm; (v) 4.5—5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) ≦10.0 mm; (xii) ≦9.0 mm; (xiii) ≦8.0 mm; (xiv) ≦7.0 mm; (xv) ≦6.0 mm; (xvi) ≦5.0 mm; (xvii) ≦4.0 mm; (xviii) ≦3.0 mm; (xix) ≦2.0 mm; (xx) ≦1.0 mm; (xxi) 0–2 mm; (xxii) 2–4 mm; (xxiii) 4–6 mm; (xxiv) 6–8 mm; and (xxv) 8–10 mm.

16. A mass spectrometer as claimed in claim 12, wherein the electrode forming said differential pumping aperture has an internal aperture of different size to the other electrodes forming said ion guide.

17. A mass spectrometer as claimed in claim 16, wherein the electrode forming said differential pumping aperture has a smaller internal aperture than the other electrodes forming said ion guide.

18. A mass spectrometer as claimed in claim 12, wherein the electrode forming said differential pumping aperture has an internal aperture substantially the same size as the other electrodes forming said ion guide.

19. A mass spectrometer as claimed in claim 12, wherein at least 90% of said plurality of electrodes are arranged to be maintained at substantially the same dc reference potential about which an AC voltage supplied to said electrodes is superimposed.

20. A mass spectrometer comprising:

an ion source;

an input vacuum chamber;

an analyser vacuum chamber including an ion mass analyser;

an intermediate vacuum chamber, said intermediate vacuum chamber being disposed between said input vacuum chamber and said analyser vacuum chamber; and an AC ion guide extending between said input vacuum chamber and said intermediate vacuum chamber, wherein said AC ion guide includes a plurality of electrodes having internal apertures; and an AC power supply for supplying an AC voltage to said electrodes, wherein electrodes in said input vacuum chamber are arranged to be supplied with an AC voltage having an amplitude and electrodes in said intermediate vacuum chamber are arranged to be supplied with an AC voltage having another, different amplitude.

21. A mass spectrometer as claimed in claim 20, wherein the amplitude of the AC voltage supplied to the electrodes in said input vacuum chamber is smaller than the amplitude of the AC voltage supplied to the electrodes in the intermediate vacuum chamber, preferably at least 100 V smaller.

22. A mass spectrometer as claimed in claim 20, wherein the amplitude of the AC voltage supplied to the electrodes in said input vacuum chamber is in the range 200–400 V and/or the amplitude of the AC voltage supplied to the electrodes in said intermediate vacuum chamber is in the range 400–600 V.

23. A method of mass spectrometry comprising:

directing ions from an ion source through both an input vacuum chamber and an intermediate vacuum chamber to a ion mass analyser located in an analyser vacuum chamber, with the ions being guided through the input and intermediate chambers through an AC ion guide extending between the input vacuum chamber and the intermediate vacuum chamber, said AC ion guide including a plurality of electrodes having internal apertures, with at least a majority of the electrodes having substantially similar sized internal apertures; and maintaining at least 90% of the plurality of electrodes at substantially the same dc voltage reference potential about which an AC voltage supplied to the electrodes is superimposed.

24. A method of mass spectrometry comprising:

directing ions from an ion source through both an input vacuum chamber and an intermediate vacuum chamber to a ion mass analyser located in an analyser vacuum chamber, with the ions being guided through the input and intermediate chambers through an AC ion guide extending between the input vacuum chamber and the intermediate vacuum chamber, said AC ion guide including a plurality of electrodes having internal apertures; and causing the ions to pass through a differential pumping aperture defined by one of the electrodes of the AC ion guide, with the differential pumping aperture being located between and spaced from both an inlet of the input vacuum chamber and an outlet of the intermediate chamber, said differential pumping aperture having an having an area ≦40 $mm^2$.

25. A method of mass spectrometry comprising:

directing ions from an ion source through both an input vacuum chamber and an intermediate vacuum chamber to a ion mass analyser located in an analyser vacuum chamber, with the ions being guided through the input and intermediate chambers through an AC ion guide extending between the input vacuum chamber and the intermediate vacuum chamber, said AC ion guide including a plurality of electrodes having internal apertures;

supplying an AC voltage having an amplitude to electrodes of the AC ion guide in the input vacuum chamber; and supplying an AC voltage having an another, different amplitude to electrodes of the AC ion guide in the intermediate vacuum chamber.

* * * * *